United States Patent
Shi et al.

(10) Patent No.: US 8,483,578 B2
(45) Date of Patent: Jul. 9, 2013

(54) PHOTONIC GENERATOR OF ULTRA-WIDE BAND MILLIMETER WAVE

(75) Inventors: Jin-Wei Shi, Taipei (TW); Tzi-hong Chiueh, Taipei (TW); Nan-Wei Chen, Taoyuan County (TW); Feng-Ming Kuo, Kaohsiung County (TW); Hsuan-Ju Tsai, Taoyuan County (TW); Hsiao-Feng Teng, Taipei (TW)

(73) Assignees: National Central University, Jhongli, Taoyuan (TW); National Taiwan University, Da-an District, Taipei (TW)

( * ) Notice: Subject to any disclaimer, the term of this patent is extended or adjusted under 35 U.S.C. 154(b) by 431 days.

(21) Appl. No.: 12/949,012

(22) Filed: Nov. 18, 2010

(65) Prior Publication Data
US 2011/0309269 A1     Dec. 22, 2011

(30) Foreign Application Priority Data
Jun. 17, 2010   (TW) ................ 99119632 A

(51) Int. Cl.
*H04B 10/04*    (2006.01)
*H04B 10/00*    (2006.01)

(52) U.S. Cl.
USPC .............................. 398/201; 398/115; 372/25

(58) Field of Classification Search
USPC ................. 398/115–117, 161, 183, 186, 201, 398/203–206; 372/9, 25
See application file for complete search history.

(56) References Cited

U.S. PATENT DOCUMENTS

| | | | |
|---|---|---|---|
| 6,724,783 B2 * | 4/2004 | Jalali et al. | 372/9 |
| 7,020,396 B2 * | 3/2006 | Izadpanah et al. | 398/66 |
| 7,650,080 B2 * | 1/2010 | Yap et al. | 398/183 |
| 7,787,779 B2 * | 8/2010 | Weiner et al. | 398/201 |

* cited by examiner

*Primary Examiner* — Hoang V Nguyen
(74) *Attorney, Agent, or Firm* — Jackson IPG PLLC

(57) ABSTRACT

A photonic generator is provided. The photonic generator uses ultra-wide band millimeter wave (MMW) for generating a high-power ultra-broad band white noise. Thus, the present disclosure can be used for failure detection of instantaneous all-band device, noise detection of instantaneous all-band amplifier and mixer, wide-band cipher transmission, pseudo-random bit generation, ADC dithering of analog-digital converter, saturation power test of wide-band optical communicator, system noise detection of MMW receiver, and gain and phase detection of MMW interferometer.

7 Claims, 11 Drawing Sheets

PHOTONIC GENERATOR OF ULTRA-WIDE BAND MILLIMETER WAVE

TECHNICAL FIELD OF THE DISCLOSURE

The present disclosure relates to a photonic generator; more particularly, relates to generating an ultra-broad band white noise for w-band (75~110 GHz) noise source testing and microwave band testing.

DESCRIPTION OF THE RELATED ARTS

As disclosed in U.S. Pat. No. 3,600,703 and U.S. Pat. No. 6,844,786, a noise diode with a broad-band low-noise amplifier is used to obtain noise. But, its output power is not enough and its change in amplitude is too big to be used as a white noise source for noise figure measurement of mixer, gain measurement of ultra-wide band instrument, digital concord of ultra-wide band analog-digital converter, ultra-wide band pseudo-random bit generation, and ultra-wide band analog.

Signals detected from outer space celestial body usually have small radio power range. Since stars may move, interference pattern happens. Thus, interference pattern signals have to be measured for a long time and stability of the measuring device becomes very important. As a result, structure of the device may become very complex, which may need thermostatic antenna, high-quality receiving amplifier and some complex components. Another choice is a middle-class receiver accompanied with a calibration device. Since band of the signal emitted from the celestial body would not be narrow and the signal should be an ultra-broad band white noise with interference pattern, a big and complex calibration device is required. Furthermore, phase of the ultra-wide band source is not under control and, thus, it is difficult to simulate optical signal source of the outer space celestial body received by antennas. Hence, the prior arts do not fulfill all users' requests on actual use.

SUMMARY OF THE DISCLOSURE

The main purpose of the present disclosure is to provide a photonic generator to generate an ultra-broad band white noise for w-band noise source testing and microwave band testing.

The second purpose of the present disclosure is to provide a device for failure detection of instantaneous all-band device, noise detection of instantaneous all-band amplifier and mixer, wide-band cipher transmission, pseudo-random bit generation, ADC dithering of analog-digital converter, saturation power test of wide-band optical communicator, system noise detection of millimeter-wave (MMW) receiver, and gain and phase detection of millimeter-wave interferometer.

To achieve the above purposes, the present disclosure is a photonic generator of ultra-wide band MMW, comprising a wide-band optical source, a MMW band photodetector and an optical fiber device, where the wide-band optical source forms and outputs a wide-band optical signal; where a part of the MMW band photodetector is located in a waveguide; where the MMW band photodetector is combined with a horn antenna through the waveguide; where the MMW band photodetector comprises an electrical signal input; a radio frequency (RF) choke connected with the electrical signal input; an optical detection switch connected with the RF choke; a fan-shaped broadband transition device connected with the optical detection switch; and an emitter connected with the optical detection switch; where the MMW band photodetector obtains a MMW ultra-wide band signal of RF from the wide-band optical signal; where the MMW band photodetector transfers the MMW ultra-wide band signal to the waveguide to be outputted by the horn antenna; where the optical fiber device is located on an optical path between the wide-band optical source and the MMW band photodetector; where the optical fiber device comprises a single mode fiber (SMF); and a lensed fiber connected with a probe head of the SMF at a side of the SMF; where the SMF is optically coupled with a fiber amplifier and an attenuator at another side of the SMF; where the wide-band optical signal is amplified by the fiber amplifier and attenuated by the attenuator; where an optical beam is expanded by the SMF to output a collimated optical beam to the lensed fiber to focus the optical beam; and where the wide-band optical signal is transferred to the lensed fiber from the SMF to be filled into the MMW band photodetector. Accordingly, a novel photonic generator of ultra-wide band MMW is obtained.

BRIEF DESCRIPTIONS OF THE DRAWINGS

The present disclosure will be better understood from the following detailed descriptions of the preferred embodiments according to the present disclosure, taken in conjunction with the accompanying drawings, in which FIG. 1 is the structural view showing the first preferred embodiment according to the present disclosure;

DESCRIPTION OF THE PREFERRED EMBODIMENTS

The following descriptions of the preferred embodiments are provided to understand the features and the structures of the present disclosure.

Figure 1:
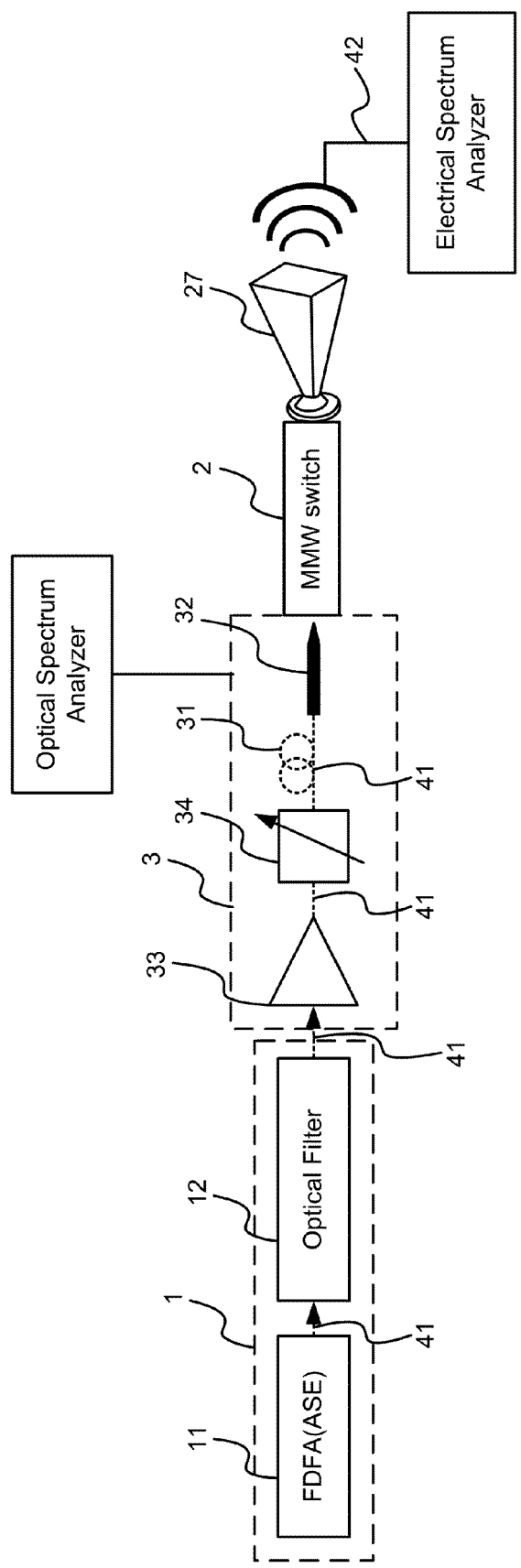
Figure 2:
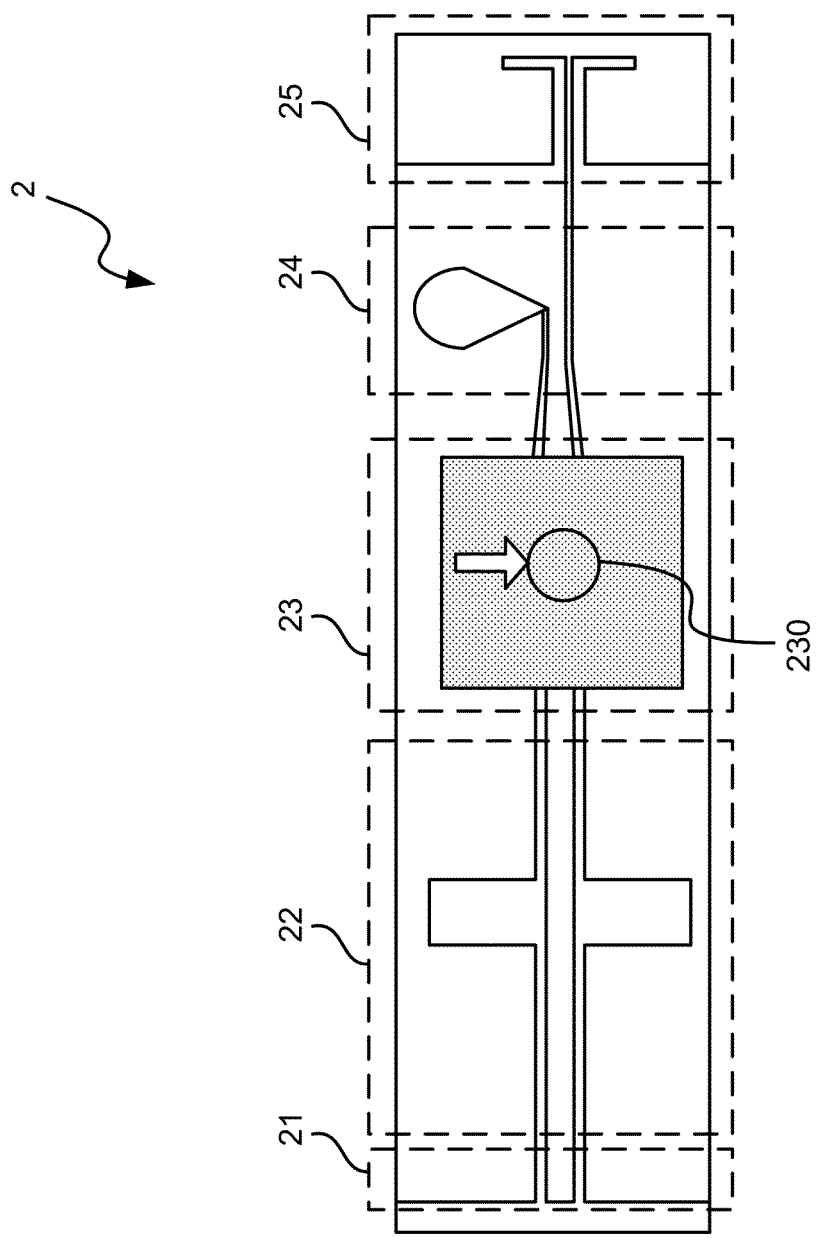
FIG. 2 is the structural view showing the MMW band photodetector.
Figure 3:
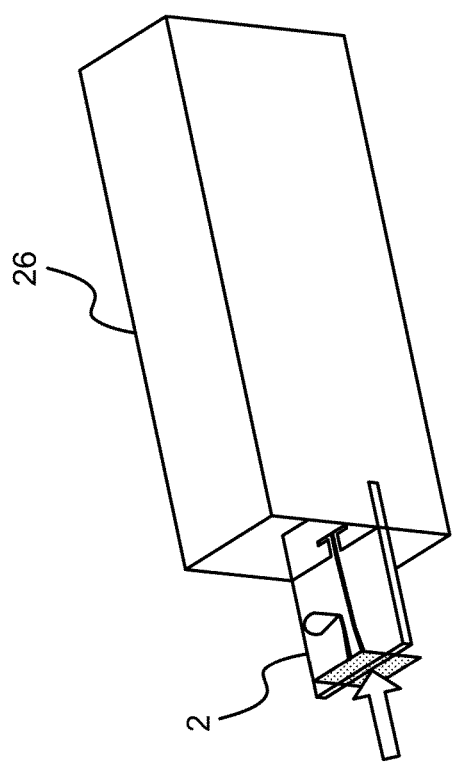
FIG. 3 is the perspective view showing the MMW band photodetector.

Please refer to FIG. 1 to FIG. 3, which are a structural view showing a first preferred embodiment according to the present disclosure; a structural view showing a millimeter-wave (MMW) band photodetector; and a perspective view showing the MMW band photodetector. As shown in the figures, the present disclosure is a photonic generator of ultra-wide band MMW, comprising a wide-band optical source 1, a MMW band photodetector 2 and an optical fiber device, which produces an ultra-broad band white noise with a simple structure.

The wide-band optical source 1 is used to generate and output a wide-band optical signal.

The MMW band photodetector 2 is set on an optical path of the optical fiber device 3. In FIG. 2 and FIG. 3, a part of the MMW band photodetector 2 is set in a waveguide 26 to be combined with a horn antenna 27 through the waveguide 26. The MMW band photodetector 2 comprises an electrical signal input 21 (IF input or DC bias); a radio frequency (RF) choke 22 connected with the electrical signal input 21; an optical detection switch 23 connected with the RF choke 22; a fan-shaped broadband transition device 24 connected with the optical detection switch 23; and an emitter 24 connected with the optical detection switch 23, where the optical detection switch 23 is made of a near-ballistic uni-traveling-carrier photodiode (NBUTC-PD); and where the emitter 25 is a Quasi-Yagi antenna.

The optical fiber device 3 is set on an optical path between the wide-band optical source 1 and the MMW band photodetector 2, where the optical fiber device 3 comprises a single mode fiber (SMF) 31 and a lensed fiber 32; where the lensed fiber 32 is set at a side of the SMF 31 and is connected with a probe head of the SMF 31; and where the SMF 31 is optically coupled with a fiber amplifier (erbium-doped fiber amplifier, EDFA) 33 and an attenuator 34 at another side of the SMF 31. Thus, a novel photonic generator of ultra-wide band MMW is obtained.

In FIG. 1, a first path 41 is optical path and a second path 42 is electrical path. On using the present disclosure, on the optical path, the wide-band optical source 1 generates and outputs a wide-band optical signal. The wide-band optical source 1 comprises an EDFA (ASE) 11 and an optical filter 12. The optical filter 12 is set between the EDFA 11 and the fiber amplifier 33. The EDFA 11 generates a wide-band optical signal through natural excitation and the wide-band optical signal is outputted after power of the wide-band optical signal is amplified. Then, the wide-band optical signal is received and filtered by the optical filter 12 to obtain a wide-band optical signal having a specific wavelength. After the wide-band optical signal is amplified by the fiber amplifier 33 and attenuated by the attenuator 34, an optical beam is expanded by the SMF 31 to output a collimated optical beam to the lensed fiber 32 for focusing optical beam. Thus, the wide-band optical signal is effectively transferred from the SMF 31 to the lensed fiber 32 for filling the wide-band optical signal into the MMW band photodetector 2 from an optical point 230 in the optical detection switch 23.

The MMW band photodetector 2 is used to transform the wide-band optical signal obtained from the wide-band optical source 1 into an electrical signal in the optical detection switch 23 for generating low RF impedance through the RF choke 22. Then, according to a wide-band signal generated by the fan-shaped broadband transition device 24, a MMW RF signal originated from the wide-band optical signal is outputted to be transferred from the emitter 25 to the waveguide 26 and emitted from the horn antenna 27.

Figure 4:
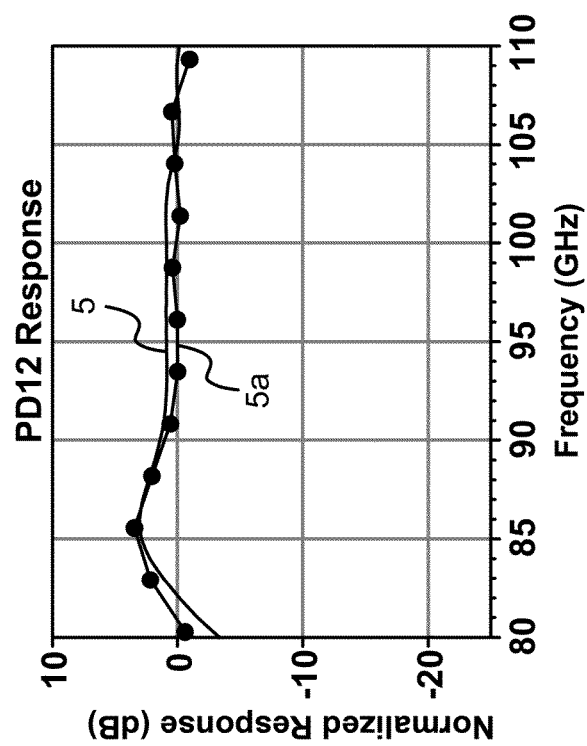
FIG. 4 is the view showing the MMW frequency response of the switch.

Please refer to FIG. 4, which is a view showing MMW frequency response of a switch. As shown in the figure, a frequency response curve of a MMW band photodetector 5 is very close to a simulated curve 5a. It means that an emitter of MMW band photodetector obtained according to the present disclosure has a good frequency response.

Figure 5:
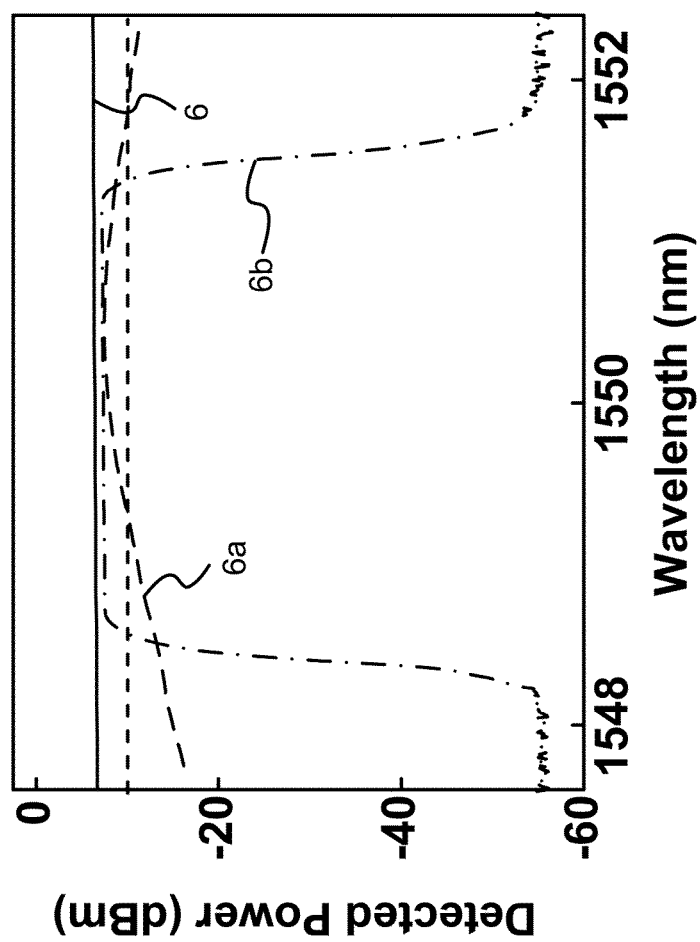
FIG. 5 is the view showing the optical spectrum.
Figure 6:
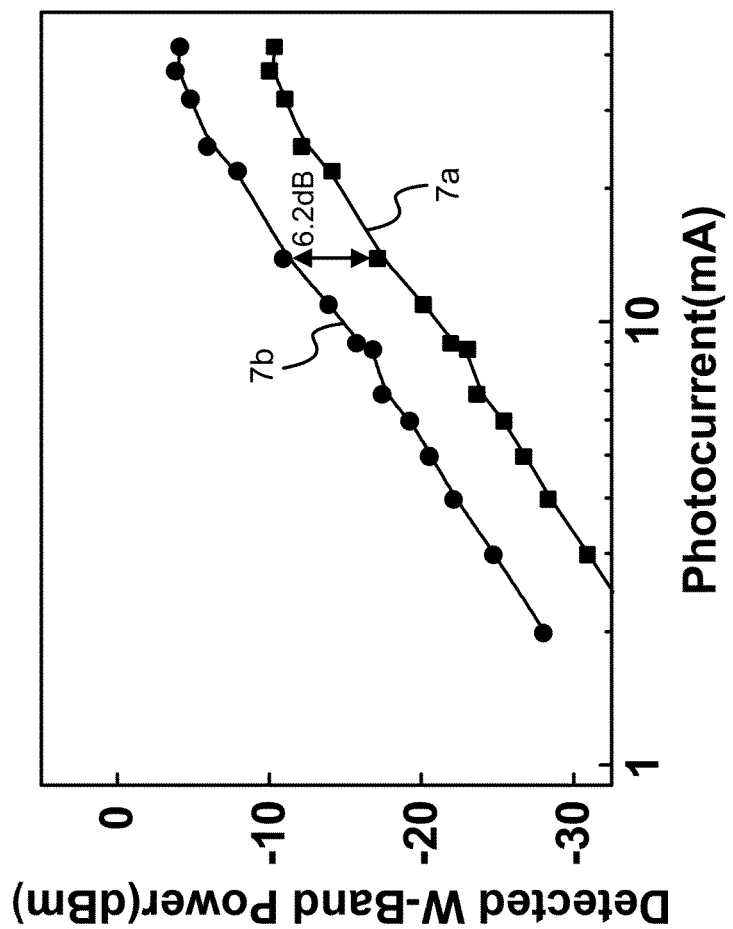
FIG. 6 is the view showing the output power of the first preferred embodiment following the change of photocurrent.
Figure 7:
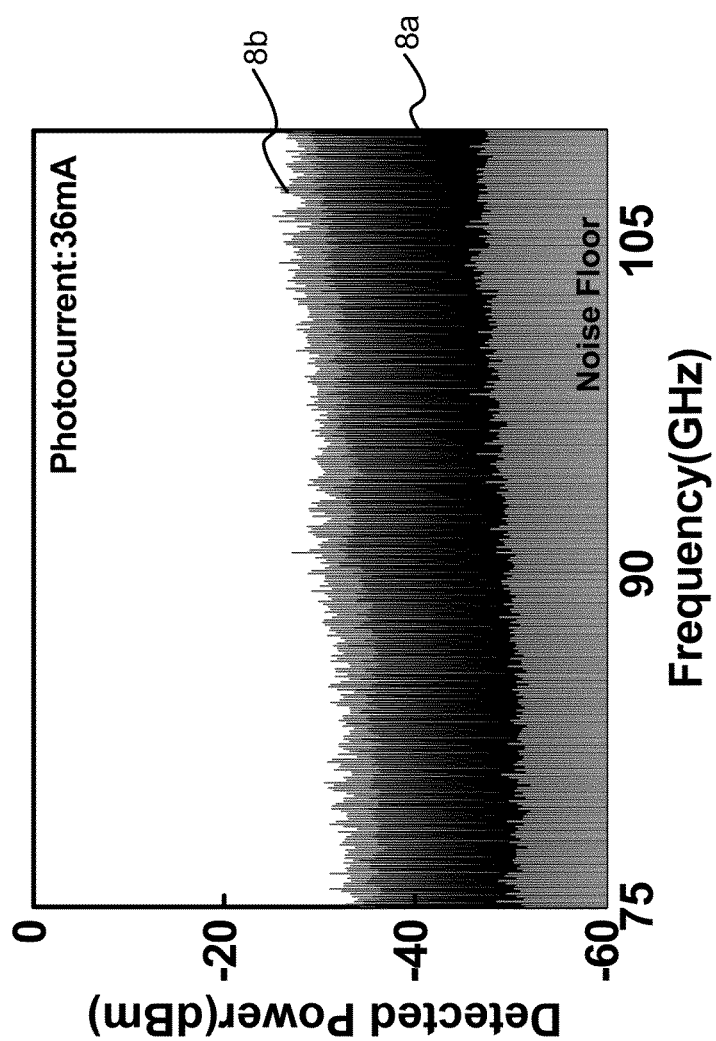
FIG. 7 is the view showing the electrical spectrum.

Please refer to FIG. 5 to FIG. 7, which is a view showing optical spectrum; a view showing output power of the first preferred embodiment following the change of photocurrent; and a view showing electrical spectrum. As shown in the figures, on an optical path, an optical spectrum analyzer is used to obtain optical spectrum by using a flat-top filter or a Gaussian filter as an optical filter. In FIG. 5, a first spectrum curve 6 is shown for the wavelengths stopped by the optical filters; a second spectrum curve 6a is shown for those passing through Gaussian filter; and a third spectrum curve 6b is shown for those passing through flat-top filter. As a result shows, each spectrum state for those passing through flat-top filter is very good and an obvious beating effect is obtained. Thus, strong wide-band MMW response is obtained; and flat-top filter is therefore better than Gaussian filter to be used in the present disclosure.

On an electrical path, an electrical spectrum analyzer is used to obtain electrical spectrum of an optical filter, i.e. a flat-top filter or a Gaussian filter. In FIG. 6, for acquiring photocurrent and power performance of the present disclosure when being operated with a flat-top filter or a Gaussian filter, first power curves 7a,7b are compared by using different optical pulse energy under a 11 mA photocurrent with a wide-band power. In FIG. 7, first and second power spectrum curves 8a,8b for those passing through a flat-top filter or a Gaussian filter are shown under a 36 mA photocurrent. As these curves show, the present disclosure uses flat-top filter to obtain a RF power which is 6.2 dBm greater than that passing through a Gaussian filter. Hence, the present disclosure provides a good photonic device for generating an ultra-wide band MMW.

Thus, the present disclosure has a simple structure for obtaining an ultra-broad band white noise having a smooth spectrum. Although the present disclosure uses W-band (75~110 GHz) noise source only, the basic principle for the present disclosure is suitable for all wave bands, from centimeter wave band to sub-MMW band.

Figure 8:
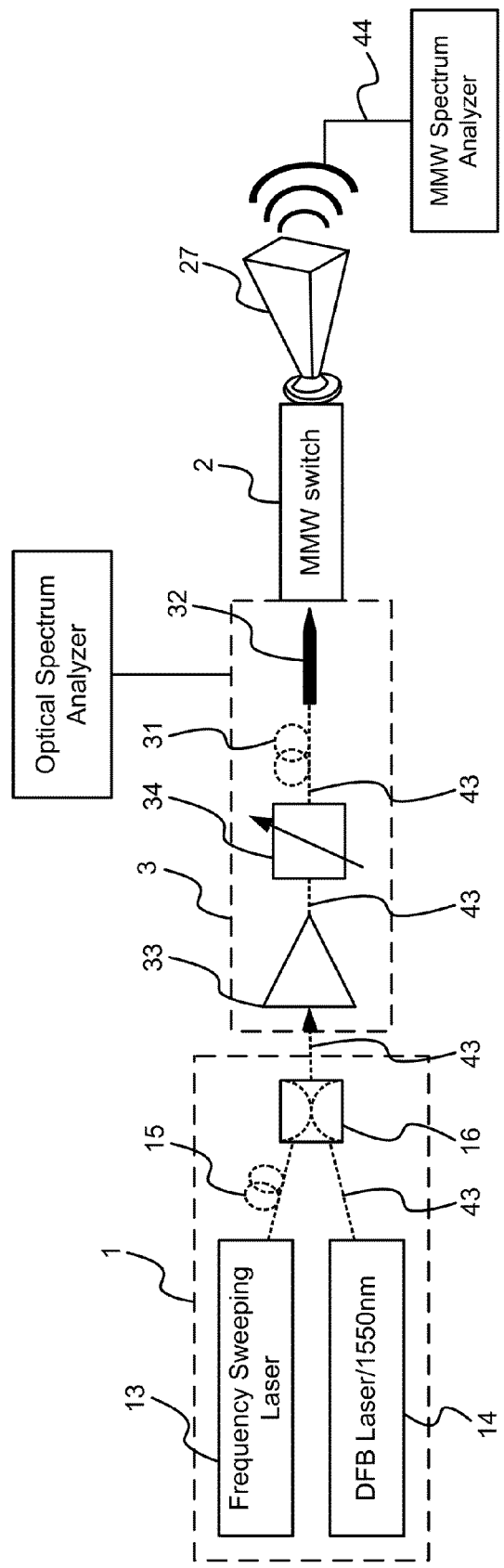
FIG. 8 is the structural view showing the second preferred embodiment.

Please refer to FIG. 8, which is a structural view showing a second preferred embodiment. As shown in the figure, a third path 43 is optical path and a fourth path 44 is electrical path. On using the present disclosure, on the optical path, a wide-band optical source 1 generates and outputs a wide-band optical signal. The wide-band optical source 1 comprises a frequency sweeping laser 13, a distributed feedback (DFB) semiconductor laser 14, a polarization controller (PC) 15 and a coupler 16. The PC 15 is set on an optical path between the frequency sweeping laser 13 and the coupler 16; and, the coupler 16 is set on an optical path between a fiber amplifier 33 and the DFB semiconductor laser 14 or the PC 15 to adjust the PC 15 for processing sequential polarization control to a first optical signal of the frequency sweeping laser 13 to be outputted to the coupler 16. At the same time, the DFB semiconductor laser 14 outputs a second optical signal having a 1550 nm wavelength to the coupler 16. Then, the coupler 16, which has a 3-dB power, couples the adjusted first optical signal and the 1550 nm second optical signal to calibrate a wide-band optical signal having a 1550 nm wavelength. After the wide-band optical signal is amplified by the fiber amplifier 33 and attenuated by the attenuator 34, an optical beam is expanded by the SMF 31 to output a collimated optical beam to the lensed fiber 32 for focusing optical beam. Thus, the wide-band optical signal is effectively transferred from the SMF 31 to the lensed fiber 32 for filling the wide-band optical signal into the MMW band photodetector 2 from an optical point 230 in the optical detection switch 23.

The MMW band photodetector 2 is used to transform the wide-band optical signal obtained from the wide-band optical source 1 into an electrical signal in the optical detection switch 23 to generate low RF impedance through the RF choke 22. Then, according to a wide-band signal generated by the fan-shaped broadband transition device 24, a MMW RF signal originated from the wide-band optical signal is outputted to be transferred from the emitter 25 to the waveguide 26 and emitted from the horn antenna 27.

Figure 9:
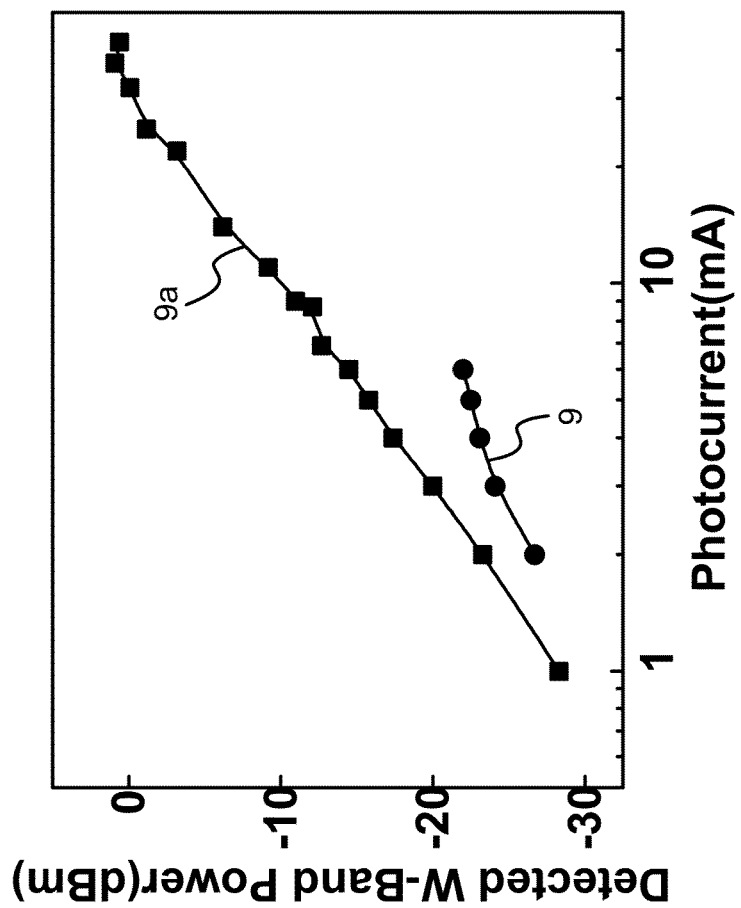
FIG. 9 is the view showing the output power of the second preferred embodiment following the change of photocurrent.
Figure 10:
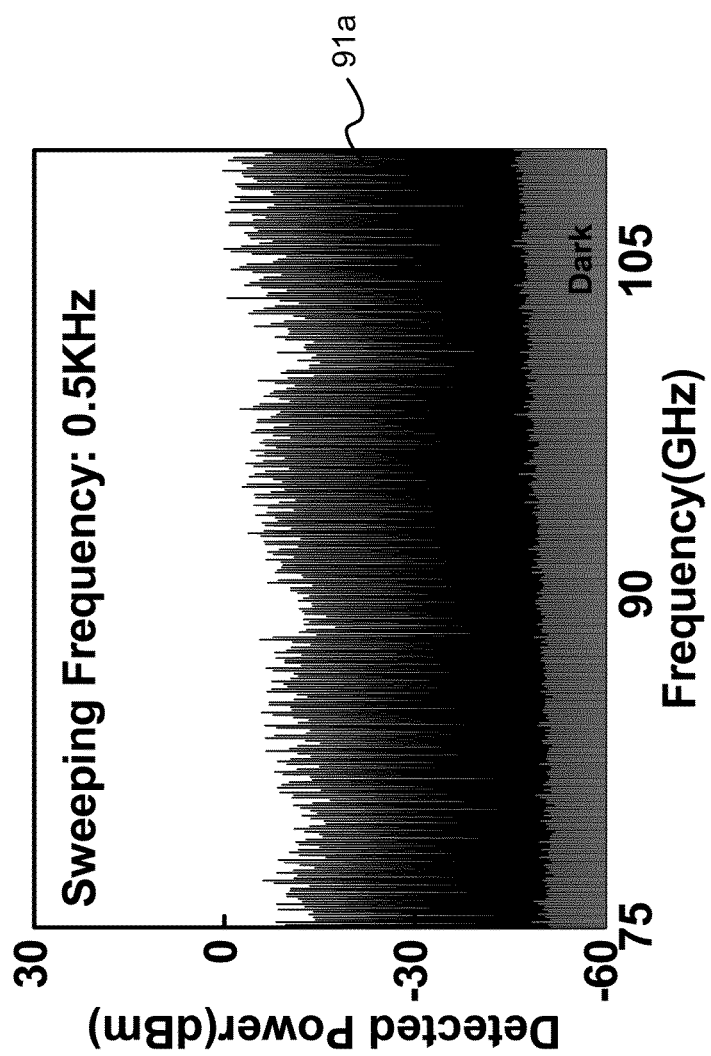
FIG. 10 is the view showing the electrical spectrum obtained through slow scanning.
Figure 11:
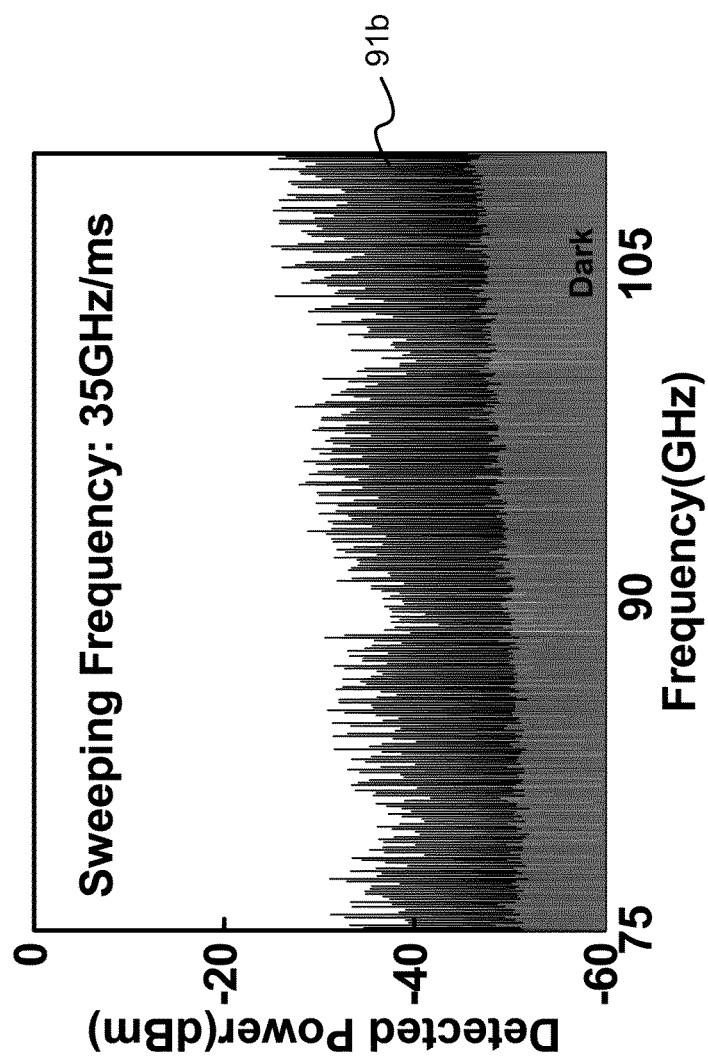
FIG. 11 is the view showing the electrical spectrum obtained through fast scanning.

Please refer to FIG. 9 to FIG. 11, which are a view showing output power of the second preferred embodiment following the change of photocurrent; and views showing electrical spectrums obtained through slow scanning and fast scanning.

As shown in the figures, on an optical path, an optical spectrum analyzer is used to check optical spectrum, and an electrical spectrum analyzer is used to check electrical spectrum. Therein, in FIG. 9, two power curves 9a,9b separately obtained by being scanned with the electrical spectrum analyzer under 7 KHz and 0.5 KHz show that the power curve 9b scanned under 0.5 KHz has bigger power. In FIG. 10, a 0.5 KHz slow scanning is processed under a 36 mA photocurrent to obtain a third power spectrum curve 91a. By comparing to a fourth power spectrum curve 91b obtained through a 35 GHz fast scanning under a 2 mA photocurrent, the third power spectrum curve 91a shows a bigger power under a slow scanning than the fourth power spectrum curve 91b under a fast scanning.

On using, the present disclosure is set before an object as a light generator for analyzing the object.

Hence, after the present disclosure generates a wide-band optical signal through a wide-band optical source, the wide-band optical signal is passed through an optical fiber device and a NBUTC photodetector to obtain a W-Band white noise with shining light. The present disclosure can be used for failure detection of instantaneous all-band device, noise detection of instantaneous all-band amplifier and mixer, wide-band cipher transmission, pseudo-random bit generation, ADC dithering of analog-digital converter, saturation power test of wide-band optical communicator, system noise detection of MMW receiver, and gain and phase detection of MMW interferometer.

To sum up, the present disclosure is a photonic generator of ultra-wide band MMW, where a ultra-broad band white noise is generated with a simple structure for w-band noise source testing and, furthermore, microwave band testing.

The preferred embodiments herein disclosed are not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A photonic generator of ultra-wide band millimeter wave (MMW), comprising:
    a wide-band optical source, said wide-band optical source obtaining and outputting a wide-band optical signal;
    a MMW band photodetector, said MMW band photodetector having a part of said MMW band photodetector located in a waveguide, said MMW band photodetector being combined with a horn antenna through said waveguide, said MMW band photodetector comprising an electrical signal input; a radio frequency (RF) choke connected with said electrical signal input; an optical detection switch connected with said RF choke; a fan-shaped broadband transition device connected with said optical detection switch; and an emitter connected with said optical detection switch, said MMW band photodetector obtaining a MMW ultra-wide band signal of RF from said wide-band optical signal, said MMW band photodetector delivering said MMW ultra-wide band signal to said waveguide to be outputted by said horn antenna; and
    an optical fiber device, said optical fiber device being positioned on an optical path between said wide-band optical source and said MMW band photodetector, said optical fiber device comprising a single mode fiber (SMF); and a lensed fiber connected with a probe head of said SMF at a side of said SMF, said SMF being optically coupled with a fiber amplifier and an attenuator at another side of said SMF,
    wherein said wide-band optical signal is amplified by said fiber amplifier and attenuated by said attenuator;
    wherein an optical beam is expanded by said SMF to output a collimated optical beam to said lensed fiber to focus optical beam; and
    wherein said wide-band optical signal is transferred to said lensed fiber from said SMF to be filled into said MMW band photodetector.

2. The photonic generator according to claim 1,
    wherein said wide-band optical source comprises an erbium-doped fiber amplifier (EDFA) and an optical filter;
    wherein said optical filter is located on an optical path between said EDFA and said fiber amplifier;
    wherein said EDFA obtains a wide-band optical signal through natural excitation to be outputted after power of said wide-band optical signal is amplified; and
    wherein said optical filter receives and filters said wide-band optical signal outputted from said EDFA to obtain a wide-band optical signal having a specific wavelength.

3. The photonic generator according to claim 2,
    wherein said optical filter is selected from a group consisting of a flat-top filter and a Gaussian filter.

4. The photonic generator according to claim 1,
    wherein said wide-band optical source comprises a frequency sweeping laser, a distributed feedback (DFB) semiconductor laser, a polarization controller (PC) and a coupler;
    wherein said PC is located on an optical path between said frequency sweeping laser and said coupler;
    wherein said coupler is located on an optical path between a device and said fiber amplifier and said device is selected from a group consisting of said DFB semiconductor laser and said PC;
    wherein said coupler adjusts said PC to process sequential polarization control to a first optical signal of said frequency sweeping laser to output said first optical signal to said coupler;
    wherein said DFB semiconductor laser outputs a second optical signal having a specific wavelength to said coupler;
    wherein said coupler couples said first optical signal and said second optical signal to calibrate a wide-band optical signal having a specific wavelength.

5. The photonic generator according to claim 1,
    wherein said emitter is a Quasi-Yagi antenna.

6. The photonic generator according to claim 1,
    wherein said wide-band optical signal is filled by said optical fiber device from an optical point in said optical detection switch of said MMW band photodetector.

7. The photonic generator according to claim 1,
    wherein said optical detection switch is made of a near-ballistic uni-traveling-carrier photodiode (NBUTC-PD).

* * * * *